US007290342B2

(12) United States Patent
Hartmann et al.

(10) Patent No.: US 7,290,342 B2
(45) Date of Patent: Nov. 6, 2007

(54) BEVEL AND DEPTH OF CUT DETENT SYSTEM

(75) Inventors: James R. Hartmann, Park Ridge, IL (US); Ralf Bocka, Musberg (DE); Joseph Z. Wascow, Mundelein, IL (US)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 10/898,853

(22) Filed: Jul. 26, 2004

(65) Prior Publication Data

US 2005/0155231 A1 Jul. 21, 2005

Related U.S. Application Data

(60) Provisional application No. 60/537,436, filed on Jan. 16, 2004.

(51) Int. Cl.
*B27B 9/02* (2006.01)
*B23D 45/16* (2006.01)

(52) U.S. Cl. ............................ 30/376; 30/377; 30/388; 403/98; 403/111; 403/325; 403/329

(58) Field of Classification Search .......... 30/374–377, 30/388–391; 83/471.3, 581; 403/46, 92, 403/98, 104, 111, 325, 328, 329
See application file for complete search history.

(56) References Cited

U.S. PATENT DOCUMENTS

| | | | | |
|---|---|---|---|---|
| 1,830,580 | A * | 11/1931 | Wappat | 30/376 |
| 4,856,394 | A * | 8/1989 | Clowers | 83/56 |
| 5,042,348 | A * | 8/1991 | Brundage et al. | 83/471.3 |
| 5,452,515 | A * | 9/1995 | Schilling | 30/376 |
| 5,620,272 | A * | 4/1997 | Sheng | 403/96 |
| 5,927,389 | A * | 7/1999 | Gonsalves et al. | 165/121 |
| 6,202,311 | B1 * | 3/2001 | Nickels, Jr. | 30/376 |
| 6,390,483 | B1 * | 5/2002 | Hsu et al. | 280/87.041 |
| 6,601,305 | B1 * | 8/2003 | Fukuoka | 30/376 |
| 6,951,057 | B2 * | 10/2005 | Yoshida et al. | 30/376 |
| 2003/0131484 | A1 | 7/2003 | Yoshida et al. | |
| 2005/0000338 | A1 * | 1/2005 | Wascow | 83/473 |
| 2005/0155232 | A1 * | 7/2005 | Bocka et al. | 30/377 |

FOREIGN PATENT DOCUMENTS

| | | |
|---|---|---|
| AU | 200027847 | 11/2000 |

* cited by examiner

*Primary Examiner*—Boyer D. Ashley
*Assistant Examiner*—Edward Landrum
(74) *Attorney, Agent, or Firm*—Greer, Burns & Crain, Ltd

(57) ABSTRACT

A circular saw assembly of the type that includes a motor housing, a handle coupled to the motor housing, a generally circular saw blade disposed within a blade housing at a first end of the motor housing, and a foot member through which the blade extends for guiding the saw assembly along a work surface, where the circular saw assembly including a depth of cut locking system and an angle of cut locking system. The depth of cut locking system includes an arcuate bracket with an arcuate slot, and an engagement member extends through the slot and is operatively connected to the motor housing and slideable in the arcuate slot. The angle of cut locking system includes a bracket having an arcuate slot and an engagement member movable in the slot and configured to the bracket. A biasing member is provided to bias the engagement member, and at least one detent recess is provided to retain the engagement member therein.

13 Claims, 7 Drawing Sheets

BEVEL AND DEPTH OF CUT DETENT SYSTEM

This application claims the benefit under 35 U.S.C. §119 of U.S. Provisional Application No. 60/537,436, filed on Jan. 16, 2004.

BACKGROUND OF THE INVENTION

The present invention generally relates to power tools and particularly to power hand tools.

The power hand tools such as miter saws, circular saws, as well as other hand tools are often provided with the capability of adjusting the depth of cut or the bevel angle. Where such adjustability is provided in a tool, there is generally a measurement display and indicator present on the tool that will enable the user to set the angle or depth of cut at the desired location after which a locking lever is generally tightened to hold the tool in its desired position. Professional users often adjust the bevel and depth setting on circular saws, miter saws and other tools, which takes time and care to get the desired setting accurately. Because there are common angles such as 22-½° and 45° for bevel angles, and particular thickness settings for depth of cut adjustments that correspond to common lumber thicknesses, e.g., ¼ inch, ½ inch, ¾ inch, 2 inches, it has been a practice for toolmakers to design the adjustable locking mechanisms to have detents at these common angles and depths.

While there has been much time and energy directed to the design of detent mechanisms that are convenient to use and accurate, there is a continuing goal of designers to develop detent systems that have superior operating capability.

SUMMARY OF THE INVENTION

A first preferred embodiment that is particularly useful in a depth of cut detent system utilizes a bracket having an arcuate slot therein with enlarged portions at the detent locations which enlarged portions generally encompass a circular shape that has a diameter that is slightly larger than the width of the slot at each detent location and wherein a locking member has a washer with a diameter larger than the width of the slot and the enlarged portions. The washer has a truncated conical extension adjacent an opening in the washer that defines an annular ramped portion that is sized to fit within the enlarged generally circular detent portions. A locking lever mechanism is spring biased toward the bracket so that the washer will engage the bracket at all times. However, the washer will not move to its fullest extent toward the bracket unless the conical extension fits within one of the enlarged circular portions, which are selectively positioned at specific predetermined locations that correlate to useful settings for users.

A second preferred embodiment of the present invention is directed to a detent system for a circular saw which has one or more detents at predetermined desired angular positions, where an elongated spring is positioned within a groove in which a portion of a locking lever is movable, wherein the spring engages the member that is moved in the slot and engages a recess at the desired detent location. The spring engages the locking member but is sufficiently flexible to allow the member to be moved along the slot.

DETAILED DESCRIPTION

Figure 1:
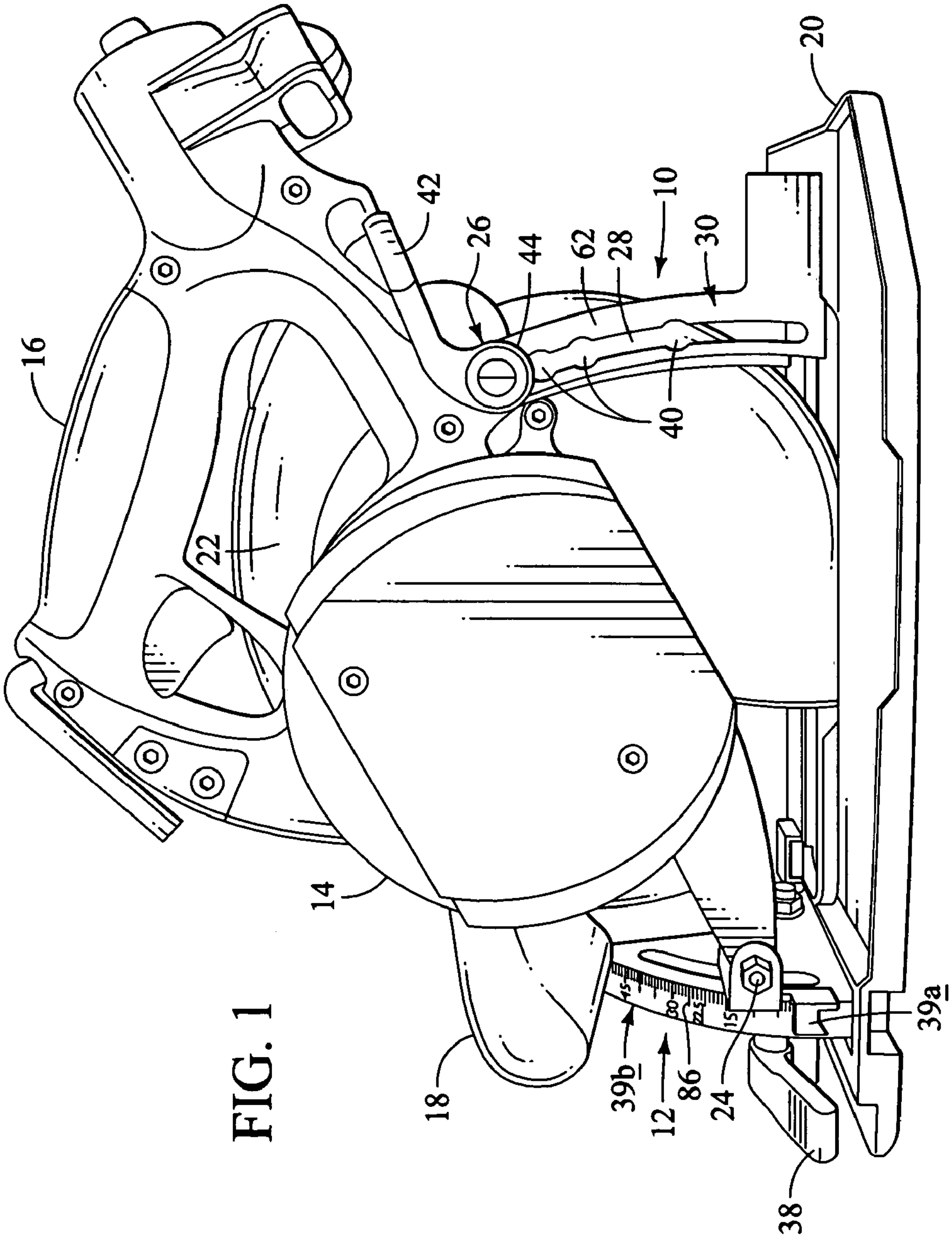
FIG. 1 is a side perspective view of a circular saw and illustrating a bevel detent system as well as a portion of a depth of cut detent system.

There are two preferred embodiments that are shown in the drawings in connection with a circular saw. The first preferred embodiment is implemented in a depth of cut detent system that is used to quickly sense and adjust the amount by which the saw blade extends below the foot portion of the saw that effectively determines the depth of cut that can be made by the saw. The second preferred embodiment is implemented in a bevel detent system that is provided with the circular saw to vary the bevel angle of the saw to a predetermined angle.

While the preferred embodiments are shown in connection with a circular saw, it should be understood that the detent systems that are disclosed and described herein may be used with other hand tools or other types of mechanisms where detents are used to define desired commonly used positions for a mechanism and where a locking capability is desired to hold the mechanism in a desired position. It should also be understood that either of the embodiments can be implemented in bevel or depth of cut detent systems.

Turning now to the drawings, and particularly FIG. 1, a circular saw is illustrated and generally shows a depth of cut detent system, indicated generally at 10, as well as a bevel detent system, indicated generally at 12. Both detent systems 10 and 12 are shown as being implemented in a circular saw of the type which has a motor housing 14, a handle 16, an auxiliary handle 18, a foot structure 20, as well as a blade housing 22 in which a saw blade is located. The saw may be adjusted to vary the depth of cut by using the depth of cut detent system 10 which enables the structure of the saw to pivot around an axis defined by a bolt 24, with a locking mechanism 26 mounted on the handle structure 16 riding within an arcuate slot 28 provided in a generally arcuate bracket 30 that is mounted to the foot 20 by bolts, screws or other structure known to those of ordinary skill in the art.

Similarly, the angle of the saw blade can be adjusted by a bevel adjusting structure that comprises a bevel bracket 32 that is preferably integrally formed with the foot structure 20 with the motor housing 14, the saw blade housing 22 and saw blade being pivotable around an axis defined by a bolt 34. An arcuate slot 36 within the bevel bracket 32 is configured to have a constant radius from the bolt 34 and a locking lever mechanism 38 enables the bevel angle to be locked in place after it has been properly positioned, which can be done by a user with a pointer 39*a* in conjunction with a gauge 39*b* that is provided on the outer top surface of the quadrant 12.

Figure 2:
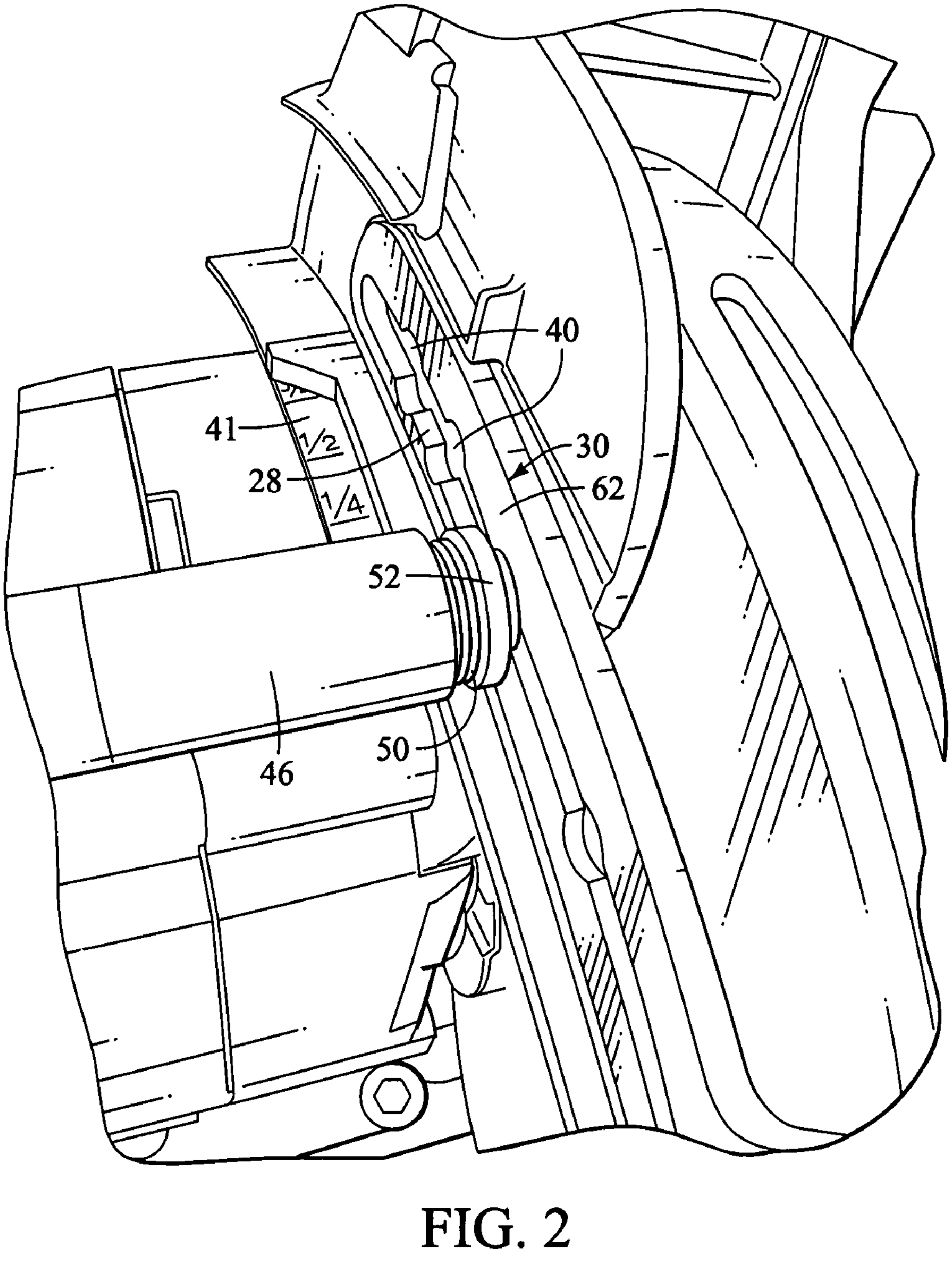
FIG. 2 is an enlarged perspective of a portion of the circular saw shown in FIG. 1 and particularly illustrating the depth cut detent system shown at a location other than a detent location.
Figure 3:
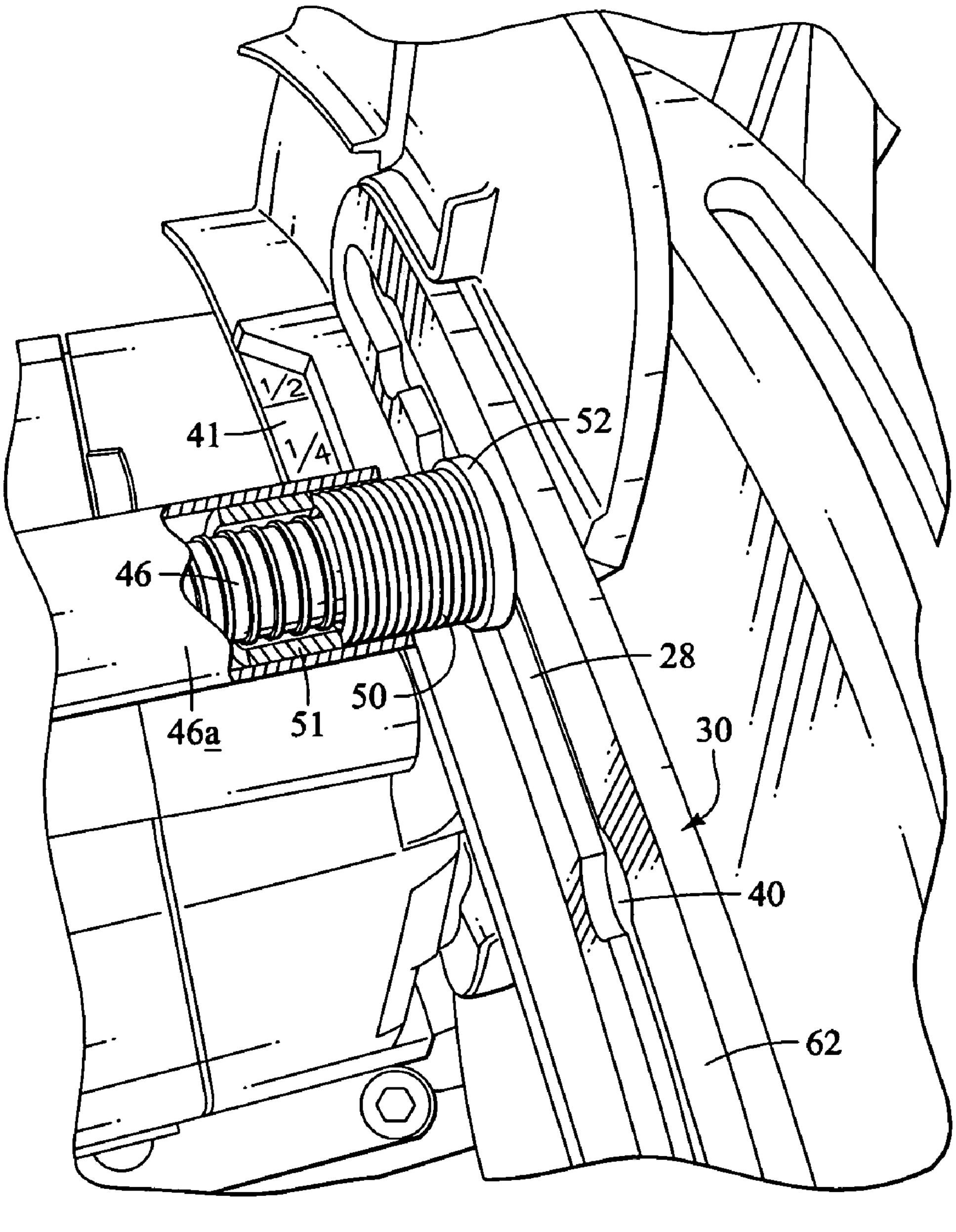
FIG. 3 is an enlarged perspective of a portion of the circular saw shown in FIG. 1 and particularly illustrating the system shown at a depth of cut detent location.
Figure 4:
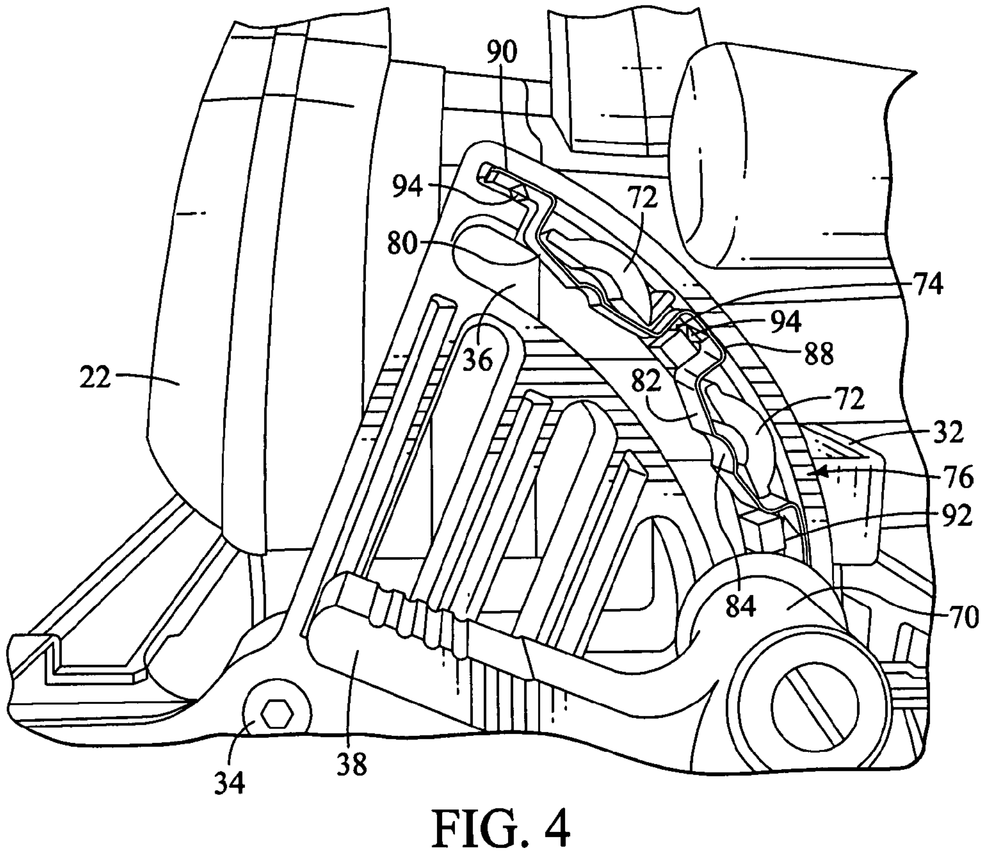
FIG. 4 is a front view of the circular saw shown in FIG. 1 and particularly illustrating a bevel quadrant and a portion of the bevel detent system.

Turning now to FIGS. 1-3 with regard to the depth of cut detent system, the bracket 30 has a number of enlarged portions 40 that are generally circular configurations relative to a width of the slot 28, and are preferably stamped cutout portions. The locking lever mechanism 26 has a lever handle 42, that when rotated in the clockwise direction in FIG. 1, will cause the clamping mechanism to hold the saw at the set position relative to the foot structure 20. In addition to the lever handle 42, the locking lever mechanism includes a cylindrical portion 44 having an elongated cylindrical extension 46 extending axially between the handle 16 and the arcuate bracket 30. While in the preferred embodiment the cylindrical extension is disposed within a sleeve 46*a*, other embodiments contemplate the absence of a sleeve altogether. A threaded insert (not shown) is configured at an end of the cylindrical extension 46. Similarly, a preferably threaded receiving member (not shown), such as a threaded stud, carriage bolt or the like extends from a side of the blade housing 22 that faces and engages the bracket 30 to threadedly engage the threaded insert extending from the cylindrical extension 46, thus coupling the locking lever mechanism 26 to the blade housing. Thus, rotation of the lever handle 42 in the clockwise direction as illustrated in FIG. 1 effects rotation of the threaded insert in the same direction, thereby clamping the bracket 30 between the threaded insert to the blade housing 22.

Conversely, when the lever 42 is moved in a counterclockwise direction with reference to FIG. 1, the extension 46 and the threaded insert will also turn in a counterclockwise direction, thereby loosening the threaded insert from the stud or carriage bolt. Once loosened, the motor housing 14, blade housing 22 and handle 16 may move with respect to the arcuate slot 28 to vary the depth of cut of the blade.

More specifically, when the locking lever 42 is moved in the clockwise direction, it will clamp the saw relative to the bracket 30 as desired. As shown in FIGS. 2 and 3, the bracket 30 preferably includes enlarged portions 40 at several locations along a length of the slot 28, wherein the enlarged portions define specific depth settings of the saw blade as are shown on a scale to the left of the slots. These enlarged portions 40 are detents, which an experienced user may perceive and utilize by feel to place the circular saw at a predetermined desired depth. Once the desired depth is reached, the locking lever 42 may then be rotated (as illustrated in FIGS. 1-3, in the clockwise direction) to clamp and hold the saw at the desired position.

To this end, a compression spring 50 is preferably disposed at an end of the cylindrical extension 46, wherein the spring is configured at a first end to engage an internal rib 51 of the sleeve 46 in the preferred embodiment (FIG. 3). At a second end, the spring is configured to engage a special washer 52 that is also provided in the preferred embodiment, and is configured to engage the enlarged portions and contact the side 62 of the bracket 30. Other embodiments of the invention contemplate that where the sleeve 46*a* is absent, the spring 50 may extend from between the special washer 52 and the handle 16.

Figure 5:
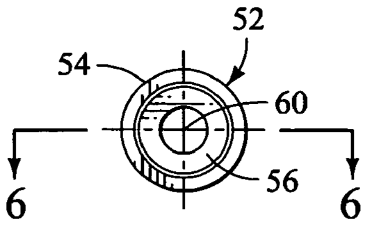
FIG. 5 is a plan view of a side of the washer that engages the locking lever portion of the depth cut detent system.
Figure 7:
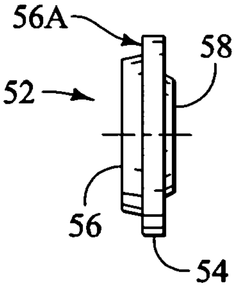
FIG. 7 is a side view of the washer shown in FIG. 5
Figure 6:
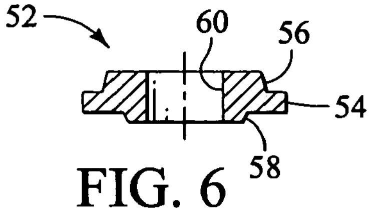
FIG. 6 is a cross-section taken generally along the line 6-6 of FIG. 5.
Figure 8:
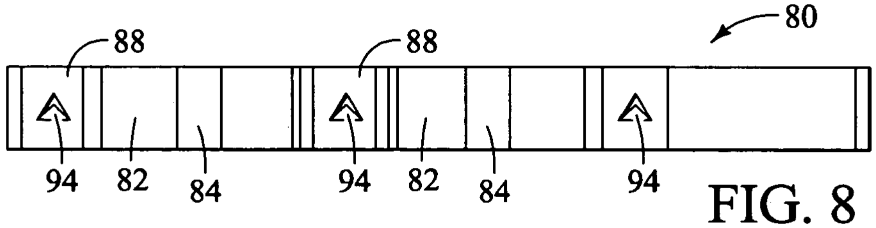
FIG. 8 is a plan view of the leaf spring.
Figure 9:
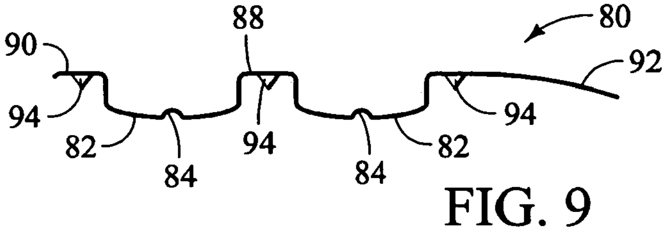
FIG. 9 is a side view of the leaf spring shown in FIG. 8.
Figure 11:
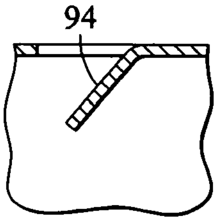
FIG. 11 is an end view of a portion of the leaf spring shown in FIG. 8.
Figure 10:
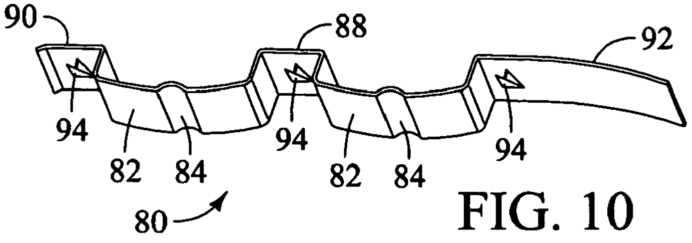
FIG. 10 is a perspective view of the leaf spring shown in FIG. 8.

As shown in FIGS. 5, 6 and 7, the washer 52 preferably includes a main portion 54 that has the largest diameter, a cylindrical extension 56 on the top side as shown, and a truncated conical portion 58 on the lower side as shown, as well as a central opening 60 extending through the washer. The washer 52 is shown in FIGS. 2 and 3 with a face 56*a* of the cylindrical extension 56 being in contact with the spring 50, the spring having an inside diameter preferably only slightly larger than the diameter of the portion 56 so that it snuggly fits thereon. The truncated conical portion 58 is biased into contact with the surface 62 of the bracket 30.

While the depth of cut detent system may be locked at any predetermined depth, when the locking lever 42 is moved into a locking position, the position of the washer 52 relative to the surface will be different depending upon whether or not the common axis of the cylindrical extension 46 and bolt, as well as the washer itself, is located in an enlarged circular portion 40. If the common axis is not in an enlarged portion 40, because the diameter of the truncated conical portion 58 is larger than the width of the slot 28, the main portion 54 will not be in contact with the surface 62. In that position, the main portion 54 is spaced away from the surface 62 by an amount approximately equal to the height of the conical portion 58 and this spaced position is illustrated in FIG. 2. When the common axis of the cylindrical portion 46 is in a circular shaped enlarged portion 40, the conical portion 58 will fit within the enlarged portion and the main portion 54 will be brought into contact with the surface 62 of the bracket. Thus, when desired, the detent system thereby accurately positions the saw in the desired position of one of the detents.

The angle of the conical portion 58 is approximately 40° relative to the axis of the washer 52, but may be varied to either a higher or lower angle if desired. A consideration for determining the angle of the conical portion 58 is that once the locking lever 42 is loosened, the angle of the conical portion 58 will affect how easily the saw can be moved within the slot 28, when it is understood that a movement along the slot will create a force tending to push the washer 52 away from the bracket 30 as it disengages the circular enlarged portion 40.

Thus, in summary, the arcuate bracket 30 extends from the foot 20, and is configured such that the locking lever mechanism 26 may engage and reciprocate within the slot 28 disposed within the bracket. Specifically, as the handle 16 and motor housing 14 are rotated with respect to the bolt 24, the conical portion 58 of the washer 52 reciprocates along a trajectory defined by the arcuate slot 28 and enlarged portion 40. At portions of the slot 28 that are not enlarged, the conical portion 58 does not matingly engage the slot, but abuts the surface 62 and may be locked into place via the threaded engagement of the threaded insert and the threaded stud, carriage bolt or the like extending from the side of the blade housing 22. Threaded engagement and disengagement of the threaded insert and the threaded receiving member is promoted by rotation of the locking lever mechanism 26, which as illustrated, is by rotation in the clockwise and counterclockwise directions respectively. At the enlarged portions 40 of the slot 28, a user may perceive and utilize by feel a detent as the conical portion 58 is urged into the enlarged portion by the biasing member 50. Since these enlarged portions 40 preferably correspond to predetermined depth of cut measurements, the user may perceive the detent and subsequently rotate the lever mechanism 26 to either engage or disengage the threaded insert and the threaded receiving member to lock the saw into that predetermined position.

Turning now to the bevel detent system and referring to FIGS. 4 and 8 through 14, the bevel bracket 32 has the slot 36 as previously described into which a threaded fastener 69 such as a carriage bolt, stud or the like extends from a side of the slot facing the motor housing 14 and is secured from rotating by the bevel bracket 32. A cylindrical portion 70 of the locking lever 38 extends through the slot 36 and threadedly engages the threaded fastener 69 from a side of the slot facing away from the motor housing. The operation of this locking lever 38 is substantially similar to that of the locking lever 26 previously described.

Figure 12:
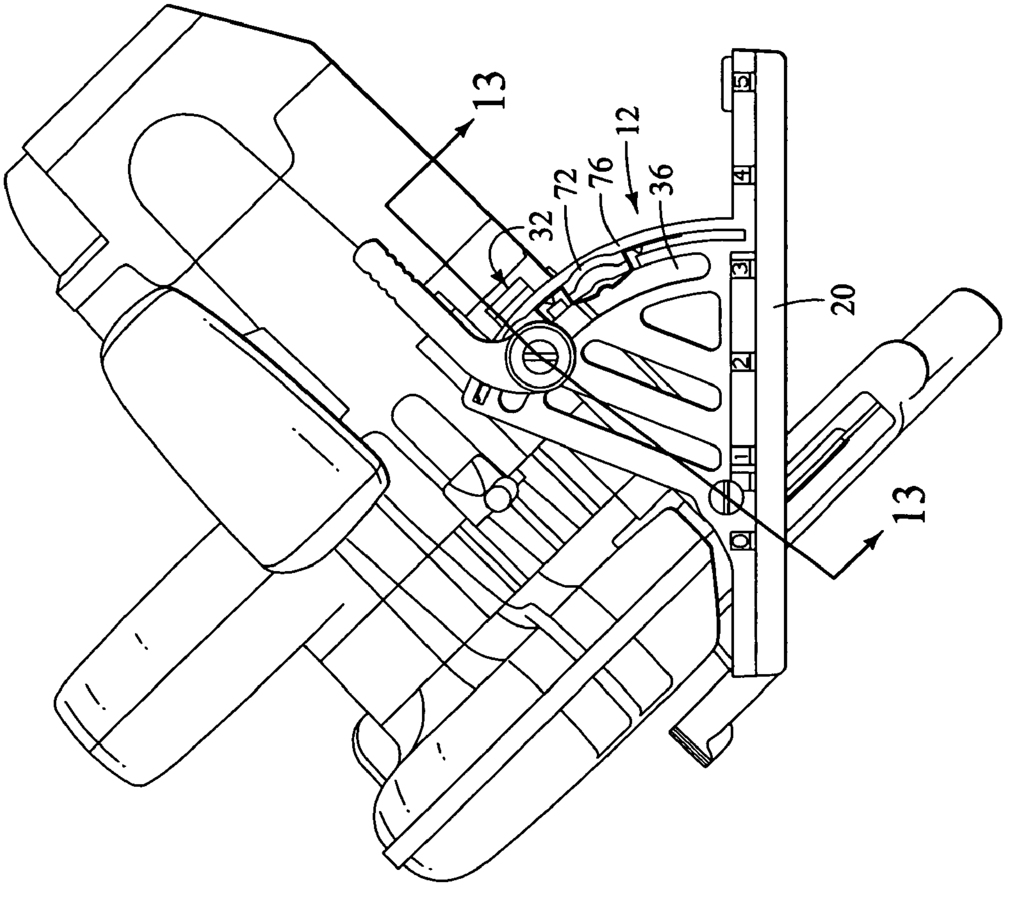
FIG. 12 is a side elevational view of a saw with the preferred bevel detent system of the instant invention.
Figure 14:
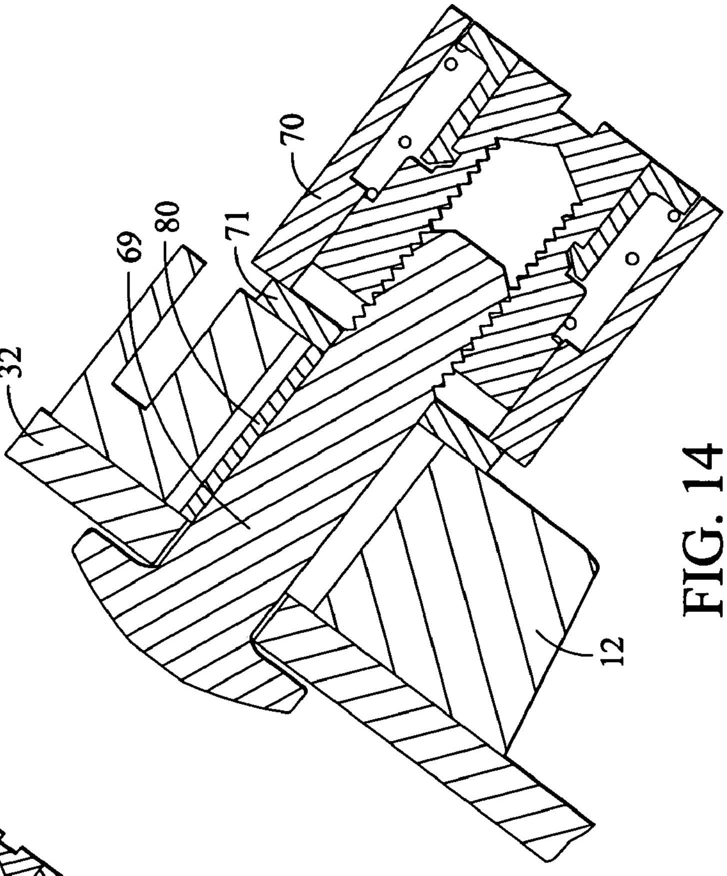
FIG. 14 is an enlarged portion of the bevel detent system illustrated in FIG. 13.
Figure 13:
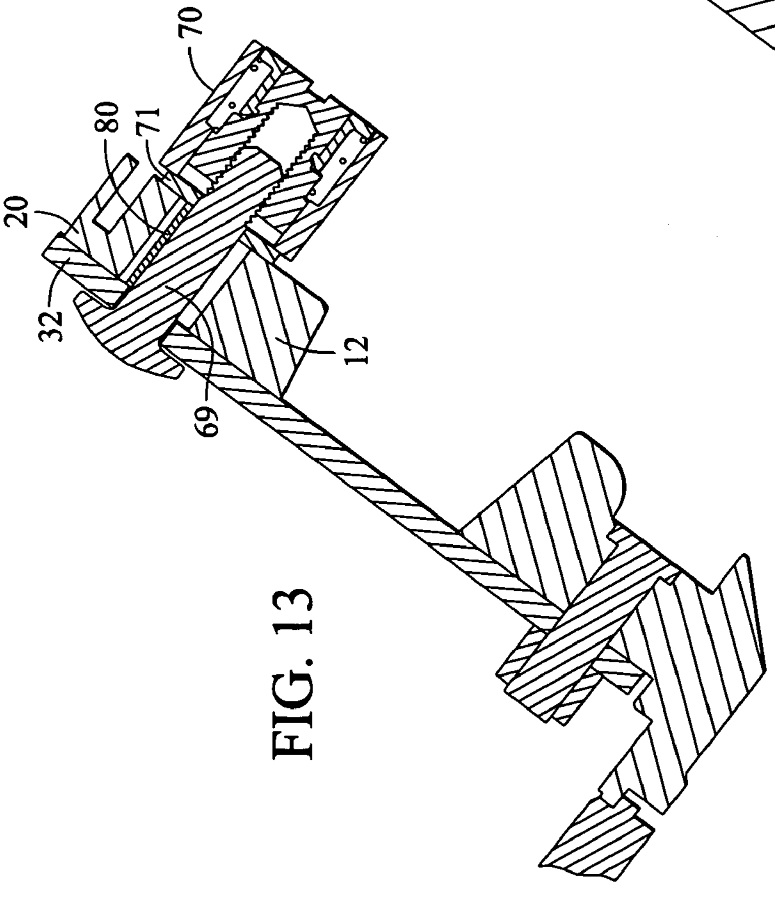
FIG. 13 is a cross-section of the bevel detent system of FIG. 12 taken generally along the line 13-13.

More specifically, the threaded fastener 69 slides within the slot 36 to any position that is desired along a length of the slot. While the respective directions in which the locking lever 38 is rotated into locking and unlocking positions, as illustrated, the locking lever 38 is rotated in a clockwise direction into locking engagement. As illustrated in FIGS. 12 and 13, the threaded fastener 69 is operably engaged to the cylindrical portion 70 of the locking lever 38, and a washer 71 is disposed between the cylindrical portion and a surface of the bevel bracket 32. Thus, rotation of the locking lever 38 in the direction of locking engagement (clockwise as illustrated) compresses the bevel bracket 32, the bevel quadrant 12, the washer 71 and the cylindrical portion 70, thereby locking the locking lever 38 into place, preferably via a clamping mechanism that clamps respective elements together to promote non-pivoting movement.

The bevel bracket 32 additionally provides a detent system at predetermined increments along the length of the slot 36 to allow the user to perceive by feel a number of predetermined angular measurements. To this end, the bevel bracket 32 additionally includes a pair of curved protrusions 72 that have recess portions 74 between the protrusions 72 and a top wall 76 in which a leaf spring, indicated generally at 80, is positioned. The leaf spring 80 has a pair of bowed flat portions 82 that extend into the slot 36 with the bowed portions having a cupped recess 84 positioned in the center of each bowed flat portion 82 to form a pair of detents that are preferably at the 22-½° and 45° positions as is commonly provided with bevel detent systems. As a guide to the user, the bevel bracket 32 may optionally include measurement indicia.

The threaded fastener 69 is configured and positioned to be moved along the slot 36 and when it reaches one of the recesses 84, it will provide a detent and hold the angular position at the desired detent position whereupon the lever 38 can be rotated into locking engagement. As a guide, measurement indicia 86 may be provided along a top surface of the bevel bracket 32. Since the leaf spring 80 is flexible, it may be locked in a position that is close to but not precisely centered into the detent 84 which enables the user to provide a bevel angle that can be locked in place at an angle very near the detent angles if desired. As is shown, the leaf spring 80 is preferably fabricated from a single piece of spring steel and it has bridging support portions 88, 90 and 92 that contact the inner surface of the top wall 76. The leaf spring also has angled tabs 94 at each support portion which engage the opposite wall defined by the recess 74 to firmly hold the leaf spring in place. The angled tabs may assume a variety of configurations, such as rectangular or pointed, and for purposes of illustration only are shown as triangular.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A locking system for selectively controlling the blade orientation relative to a work surface of a circular blade in a circular saw assembly of the type that includes a motor housing having a handle , the generally circular saw blade disposed within a blade housing at a first end of the motor housing, and a foot member through which the blade extends for guiding the saw assembly along the work surface, said system comprising:

an arcuate bracket extending from a top surface of the foot member;

an arcuate slot disposed along at least a portion of a length of said bracket;

at least one arcuate biasing member connected to said bracket and having detent portions extending into said arcuate slot, including at least one detent recess;

an engagement member configured to engage said slot and to threadedly receive a threaded fastener extending from the motor housing, said engagement member contacting said biasing member as it is moved along said slot; and a pivotable lever configured to rotate said engagement member extending radially therefrom, wherein said engagement member is configured to lockingly engage said bracket along said slot.

2. The locking system of claim 1 wherein said engagement member comprises an at least partially threaded, generally hollow and cylindrical body.

3. The locking system of claim 1 further comprising a center member from which all points on a radius of said bracket have an equal radius.

4. The locking system of claim 1 further comprising measurement indicia at a top surface of said bracket to indicate an angle of cut.

5. A locking system for selectively controlling the blade orientation relative to a work surface in a circular saw assembly of the type that includes a motor housing having a handle, a generally circular saw blade disposed within a blade housing at a first end of the motor housing, and a foot member for guiding the saw assembly along the work surface, said system comprising:

an arcuate bracket having a length that extends upwardly from a top side of the foot member;

an arcuate slot disposed within said length of said bracket;

at least one enlarged portions disposed along a length of said slot at predetermined increments;

an engagement member extending from the motor housing in a direction generally perpendicular to said bracket, said engagement member including a clamping assembly at a first end thereof that is sized and configured to selectively engage said bracket and the blade housing, said clamping assembly comprises a spring-biased washer having a main body and an engagement portion configured to be a generally conical extension having a truncated top end and a central orifice therethrough; and a pivotable lever extending radially from said engagement member and configured to be operatively engaged to said engagement member to rotate said engagement member.

6. The locking system of claim 5 wherein said enlarged portions are configured to be generally circular in shape.

7. The locking system of claim 5 further comprising a plurality of enlarged portions disposed along a length of said slot at predetermined increments.

8. The locking system of claim 5 wherein said engagement portion has a predetermined diameter that is at least slightly greater than a diameter of said slot but is at least slightly smaller than a diameter of said enlarged portion.

9. The locking system of claim 5 wherein said engagement portion is disposed at an angle of approximately 40° relative to said main body.

10. The locking system of claim 5 further comprising measurement indicia disposed along a length of said slot to indicate a depth of cut.

11. A circular saw assembly of the type that includes a motor housing, a handle coupled to the motor housing, a generally circular saw blade disposed within a blade housing at a first end of the motor housing and a foot member for guiding the saw assembly along a work surface, said circular saw assembly comprising:

a depth of cut locking system comprising an arcuate bracket having an arcuate slot extending therethrough, a first engagement member operatively connected to the blade housing and slideable in said arcuate slot, wherein said bracket is configured to have a plurality of enlarged portions along the length of said slot, said first engagement member lockingly engaging at least said enlarged portions of said bracket and the blade housing and including a clamping assembly that comprises a spring-biased washer having a main body and an engagement portion configured to be a generally conical extension having a truncated top end and a central orifice therethrough, and a lever portion for moving said first engagement member to selectively engage and disengage said bracket and the blade housing; and an angle of cut locking system comprising a bracket having an arcuate slot, a second engagement member movable in said slot and configured to engage said bracket, at least one biasing member configured to bias said second engagement member, at least one detent recess configured in said biasing member to engage and retain said second engagement member therein, and a lever portion for selectively locking said second engagement member relative to said bracket.

12. The circular saw assembly of claim 11 wherein said engagement portion has a predetermined diameter at a base thereof that is at least slightly greater than a diameter of said slot but is at least slightly smaller than a diameter of said enlarged portion.

13. The circular saw assembly of claim 11 wherein said second engagement member comprises an at least partially threaded, generally hollow and cylindrical body.

* * * * *